(12) United States Patent
Amarendran et al.

(10) Patent No.: US 7,490,207 B2
(45) Date of Patent: Feb. 10, 2009

(54) SYSTEM AND METHOD FOR PERFORMING AUXILLARY STORAGE OPERATIONS

(75) Inventors: Arun Prasad Amarendran, Bangalore (IN); Manoj Kumar Vijayan Retnamma, Marlboro, NJ (US); Anand Prahlad, East Brunswick, NJ (US); Parag Gokhale, Ocean, NJ (US); Jun Lu, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 11/269,119

(22) Filed: Nov. 8, 2005

(65) Prior Publication Data

US 2006/0230244 A1    Oct. 12, 2006

Related U.S. Application Data

(60) Provisional application No. 60/626,076, filed on Nov. 8, 2004.

(51) Int. Cl.
*G06F 12/16* (2006.01)
*G06F 12/08* (2006.01)
*G06F 11/00* (2006.01)

(52) U.S. Cl. .................... 711/165; 711/112; 714/5
(58) Field of Classification Search ............... None
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |

(Continued)

FOREIGN PATENT DOCUMENTS

EP     0259912     3/1988

(Continued)

OTHER PUBLICATIONS

U.S. Appl. No. 11/269,521.

(Continued)

*Primary Examiner*—Hyung Sough
*Assistant Examiner*—Duc T Doan
(74) *Attorney, Agent, or Firm*—Knobbe, Martens, Olson & Bear, LLP (57) ABSTRACT

Systems and methods for protecting data in a tiered storage system are provided. The storage system comprises a management server, a media management component connected to the management server, a plurality of storage media connected to the media management component, and a data source connected to the media management component. Source data is copied from a source to a buffer to produce intermediate data. The intermediate data is copied to both a first and second medium to produce a primary and auxiliary copy, respectively. An auxiliary copy may be made from another auxiliary copy. An auxiliary copy may also be made from a primary copy right before the primary copy is pruned.

25 Claims, 6 Drawing Sheets

U.S. PATENT DOCUMENTS

| | | |
|---|---|---|
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitsky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,829,023 A | 10/1998 | Bishop |
| 5,829,046 A | 10/1998 | Tzelnic et al. |
| 5,875,478 A | 2/1999 | Blumenau |
| 5,887,134 A | 3/1999 | Ebrahim |
| 5,890,159 A * | 3/1999 | Sealby et al. ............... 707/10 |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,487,644 B1 | 11/2002 | Huebsch et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,631,493 B2 | 10/2003 | Ottesen et al. |
| 6,658,436 B2 | 12/2003 | Oshinsy et al. |
| 6,658,526 B2 | 12/2003 | Nguyen et al. |
| 6,732,124 B1 | 5/2004 | Koseki et al. |
| 6,791,910 B1 | 9/2004 | James et al. |
| 6,886,020 B1 | 4/2005 | Zahavi et al. |
| 7,035,880 B1 | 4/2006 | Crescenti et al. |
| 7,069,380 B2 * | 6/2006 | Ogawa et al. ............... 711/112 |
| 7,117,246 B2 | 10/2006 | Christenson et al. |
| 7,130,970 B2 | 10/2006 | Devassy et al. |
| 7,155,633 B2 * | 12/2006 | Tuma et al. .................... 714/5 |
| 7,159,110 B2 * | 1/2007 | Douceur et al. ............. 713/165 |
| 7,246,272 B2 | 7/2007 | Cabezas et al. |
| 7,287,252 B2 | 10/2007 | Bussiere et al. |
| 2002/0004883 A1 | 1/2002 | Nguyen et al. |
| 2002/0029281 A1 | 3/2002 | Zeidner et al. |
| 2002/0194340 A1 | 12/2002 | Ebstyne et al. |
| 2003/0014433 A1 | 1/2003 | Teloh et al. |
| 2003/0016609 A1 | 1/2003 | Rushton et al. |
| 2003/0169733 A1 | 9/2003 | Gurkowski et al. |
| 2003/0188114 A1 | 10/2003 | Lubbers et al. |
| 2004/0010487 A1 | 1/2004 | Prahlad et al. |
| 2004/0073716 A1 * | 4/2004 | Boom et al. ................. 709/250 |
| 2005/0033800 A1 | 2/2005 | Kavuri et al. |
| 2005/0044114 A1 | 2/2005 | Kottomtharayil et al. |
| 2005/0114406 A1 | 5/2005 | Borthakur et al. |
| 2005/0144520 A1 | 6/2005 | Tuma et al. |
| 2005/0166011 A1 | 7/2005 | Burnett et al. |
| 2005/0172093 A1 | 8/2005 | Jain |
| 2005/0256972 A1 * | 11/2005 | Cochran et al. ............. 709/245 |
| 2005/0262296 A1 | 11/2005 | Peake |
| 2006/0224846 A1 | 10/2006 | Amarendran et al. |
| 2006/0224852 A1 | 10/2006 | Kottomtharayil et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| EP | 1174795 | 1/2002 |
| WO | WO-95/13580 | 5/1995 |
| WO | WO-99/12098 | 3/1999 |
| WO | WO 99/14692 | 3/1999 |
| WO | WO 2005/055093 | 6/2005 |

OTHER PUBLICATIONS

U.S. Appl. No. 11/269,520.
U.S. Appl. No. 11/269,519, Kavuri et al.
U.S. Appl. No. 11/269,515.
U.S. Appl. No. 11/269,513.
U.S. Appl. No. 11/269,136, Retnamma et al.
Armstead et al., "Implementation of a Campus-wide Distributed Mass Storage Service: The Dream vs. Reality," *IEEE*, 1995, pp. 190-199.
Arneson, David A., Control Data Corporation, *Development of Omniserver*, Mass Storage Systems, 1990, pp. 88-93.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

Written Opinion; International Application No. PCT/US05/40606; mailed Feb. 14, 2007; 5 pages.

* cited by examiner

SYSTEM AND METHOD FOR PERFORMING AUXILLARY STORAGE OPERATIONS

PRIORITY CLAIM

This application claims the benefit of U.S. provisional application No. 60/626,076 titled SYSTEM AND METHOD FOR PERFORMING STORAGE OPERATIONS IN A COMPUTER NETWORK, filed Nov. 8, 2004, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

RELATED APPLICATIONS

This application is related to the following applications, each of which is incorporated herein by reference in its entirety:

application Ser. No. 09/354,058, titled HIERARCHICAL BACKUP AND RETRIEVAL SYSTEM, filed Jul. 15, 1999;

U.S. Pat. No. 6,418,478, titled PIPELINED HIGH SPEED DATA TRANSFER MECHANISM, filed Mar. 11, 1998;

application Ser. No. 101144,683, titled PIPE-LINED HIGH SPEED DATA TRANSFER MECHANISM, filed May 13, 2002;

application Ser. No. 09/495,751 titled HIGH SPEED DATA TRANSFER MECHANISM, filed Feb. 1, 2000;

application Ser. No. 10/818,749, titled SYSTEM AND METHOD FOR PERFORMING STORAGE OPERATIONS IN A COMPUTER NETWORK, filed May 5, 2004;

application Ser. No. 10/877,831 titled HIERARCHICAL SYSTEM AND METHOD FOR PERFORMING STORAGE OPERATIONS IN A COMPUTER NET-WORK, filed Jun. 25, 2004;

application Ser. No. 10/803,542 titled METHOD AND SYSTEM FOR TRANSFERRING DATA IN A STORAGE OPERATION, filed Mar. 18, 2004;

application Ser. No. 11/269,520, titled SYSTEM AND METHOD FOR PERFORMING MULTISTREAM STORAGE OPERATIONS, filed Nov. 7, 2005;

application Ser. No. 11/269,512, titled SYSTEM AND METHOD TO SUPPORT SINGLE INSTANCE STORAGE OPERATIONS, filed Nov. 7, 2005;

application Ser. No. 11/269,514, titled METHOD AND SYSTEM OF POOLING STORAGE DEVICES, filed Nov. 7, 2005;

application Ser. No. 11/269,521, titled METHOD AND SYSTEM FOR SELECTIVELY DELETING STORED DATA, filed Nov. 7, 2005;

application Ser. No. 11/269,519, titled METHOD AND SYSTEM FOR GROUPING STORAGE SYSTEM COMPONENTS, filed Nov. 7, 2005;

application Ser. No. 11/269,515, titled SYSTEMS AND METHODS FOR RECOVERING ELECTRONIC INFORMATION FROM A STORAGE MEDIUM, filed Nov. 7, 2005; and application Ser. No. 11/269,513, titled METHOD AND SYSTEM FOR MONITORING A STORAGE NETWORK, filed Nov. 7, 2005

BACKGROUND OF THE INVENTION

The invention relates to data storage in a computer network and, more particularly, to a system and method for providing a user with additional storage operation options.

Businesses and other organizations store a large amount of important data in electronic form on their computer networks. To protect this stored data, network administrators make copies of the stored information so that if the original data is destroyed or corrupted, a copy may be used in place of the original. There are storage systems available from several vendors, including Commvault Systems, EMC Corp., HP, Veritas, and others, which automate certain functions associated with data storage.

These and similar systems are designed to manage data storage according to a technique referred to as information lifecycle management, or ILM. In ILM, data is stored in a tiered storage pattern, in which live data in use by users of a network, sometimes referred to as operational or production data, is backed up by a storage operation to other storage devices. The first backup is sometimes referred to as the primary copy, and is used in the first instance to restore the production data in the event of a disaster or other loss or corruption of the production data. Under traditional tiered storage, the data on the primary storage device is migrated to other devices, sometimes referred to as secondary or auxiliary storage devices. This migration can occur after a certain amount of time from which the data is first stored on the primary device, or for certain types of data as selected in accordance with a user-defined policy. Usually, with tiered storage patterns, the storage devices used to store auxiliary or secondary copies of data have less availability, lower performance, and/or fewer resources than devices storing the production or primary copies. That is, primary storage devices tend be faster, higher capacity and more readily available devices, such as magnetic hard drives, than the ones used for storing auxiliary copies, such as magnetic or optical disks or other removable media storage devices.

Figure 1:
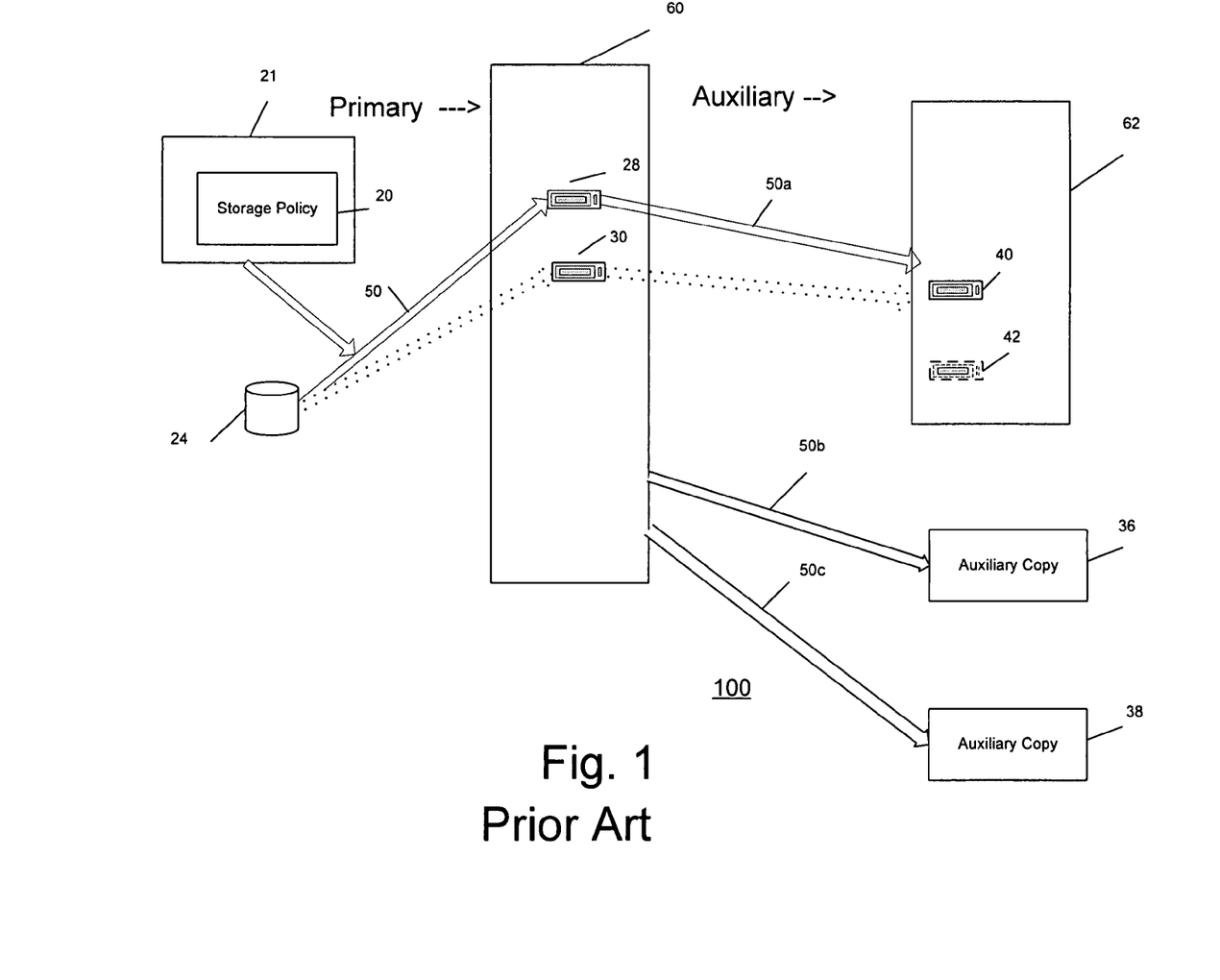
FIG. 1 is a block diagram showing a storage system in accordance with the prior art.

By way of example, FIG. 1 shows a library storage system 100 that employs principles of tiered storage. Storage policies 20 in a management server 21 are used to copy production data from a production data store 24 to physical media locations 28, 30 which serve as the primary copies or devices 60. When a storage policy dictates that a storage operation is to be performed, the production data 24 is copied to media 28, 30 based on storage policy 20 using transfer stream 50. Storage operations include, but are not limited to, creation, storage, retrieval, migration, deletion, and tracking of primary or production volume data, secondary volume data, primary copies, secondary copies, auxiliary copies, snapshot copies, backup copies, incremental copies, differential copies, HSM copies, archive copies, and other types of copies and versions of electronic data.

A storage policy is generally a data structure or other information which includes a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy may be stored to a storage manager index, to archive media as metadata for use in restore operations or other storage operations, or to other locations or components of the system.

In FIG. 1, a primary copy 60 of production data 24 is stored on media 28 and 30. Primary copy 60 might, for example, include data that is frequently accessed for a period of one to two weeks after it is stored. A storage administrator might find storing such data on a set of drives with fast access times preferable. On the other hand, such fast drives are expensive and once the data stored in a primary copy 60 is no longer accessed as frequently, the storage administrator might find it desirable to move and copy this data to an auxiliary or secondary copy data set 62 on a less expensive tape library or other device with slower access times. Once the data from primary data set 60 is moved to auxiliary data set 62, primary data 60 can be deleted thereby freeing up drive space on media or devices 28, 30 for primary copies of new production data. In FIG. 1, auxiliary data set 62 including drives or tapes 40, and 42 as needed, are produced from drives 28, 30 of primary copy 60 using a transfer stream 50a. Thus, tiered storage performs auxiliary storage operations after a primary data set has been created.

For example, primary copy 60 may be made on a Tuesday evening at 2:00 AM and then auxiliary copy 62 will be made from primary copy 60 every Tuesday at 4:00 AM. Changes made to primary copy 60 are reflected in auxiliary copy 62 when auxiliary copy 62 is created. Similarly, multiple auxiliary copies 36, 38 may be made from primary copy 60 using respective transfer streams 50b, 50c. Thus, every time a change is made to primary copy 60, for example when data from production data store 24 is updated, that change is eventually reflected in all auxiliary copies 62, 36 and 38. Auxiliary copies 62, 36 and 38 typically include all of the primary copy data and primary copy metadata. This metadata enables the auxiliary copy 62, 36 and 38 to operate independently of the primary copy 60.

Although the tiered storage provided by ILM systems is effective in managing the storing and restoring of production data, it has several shortcomings. First, interruptions may occur during the creation of the primary copy 60, or the primary copy 60 itself may become corrupted or lost. If one or more auxiliary copies 62, 36 and 38 are not made when this happens, the interruption or loss prevents the creation of any auxiliary copies 62, 36 and 38, in which case no copy of the source data may be available to restore the production volume.

Moreover, some tiered storage systems require that auxiliary copies 62, 36 and 38 be updated or produced every time a primary copy 60 is changed. However, if the source data is not very sensitive, there may not be a need for an auxiliary copy 62, 36 and 38 to be created to keep up with every minor change to a primary copy 60. Some applications may not be significantly affected if the auxiliary copy 62, 36 and 38 is current as of, for example, a month's old version of the primary copy 60. Moreover, in order to maintain an auxiliary copy 62, 36 and 38 essentially mirroring a primary copy 60, many resources are required and the auxiliary copy 62, 36 and 38 may need to frequently feed off of the primary copy 60 making the primary copy 60 unavailable.

Therefore, it is desirable to modify the sequence of storage operations in tiered storage systems to account for and resolve these potential problems.

SUMMARY OF THE INVENTION

In one embodiment of the invention, a method for storing data in a tiered storage system is provided in which the tiered storage system includes a plurality of storage media, one or more first storage media being designated for use in storing one or more primary copies of production data and one or more second storage media being designated for use in storing one or more auxiliary copies of production data. The method includes: copying the production data from a data source to a first location to produce intermediate data; copying the intermediate data to a first storage medium to produce a primary copy of the production data; and while the primary copy is still being produced, copying the intermediate data to a second storage medium to produce an auxiliary copy of the production data. The copying of source data and intermediate data may be monitored. Monitoring of the copy operation(s) may determine that an interruption occurred in the production of the primary copy or auxiliary copy. The monitoring method may complete the production of the uninterrupted copy; and thereafter, when the interruption is resolved, complete the interrupted production of the primary or auxiliary copy.

In another embodiment of the invention, a method for storing data in a tiered storage system is provided in which the tiered storage system comprising a plurality of storage media, one or more first storage media being designated for use in storing one or more primary copies of production data and one or more second storage media being designated for use in storing one or more auxiliary copies of production data. The method includes: selecting a set of production data to be copied; beginning to create a primary copy of the production data set on a first storage medium; and while the primary copy is being created, beginning to create an auxiliary copy of the production data set from the primary copy.

In another embodiment of the invention, a method for storing data in a tiered storage system in provided in which, the tiered storage system comprising a plurality of storage media, one or more first storage media being designated for use in storing one or more primary copies of production data and one or more second storage media being designated for use in storing one or more auxiliary copies of production data. The method includes: creating a primary copy of production data on a first storage medium; copying the primary copy to one of the second storage media to produce a first auxiliary copy; and copying the first auxiliary copy to another of the second storage media to produce a second auxiliary copy.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT(S)

Figure 2:
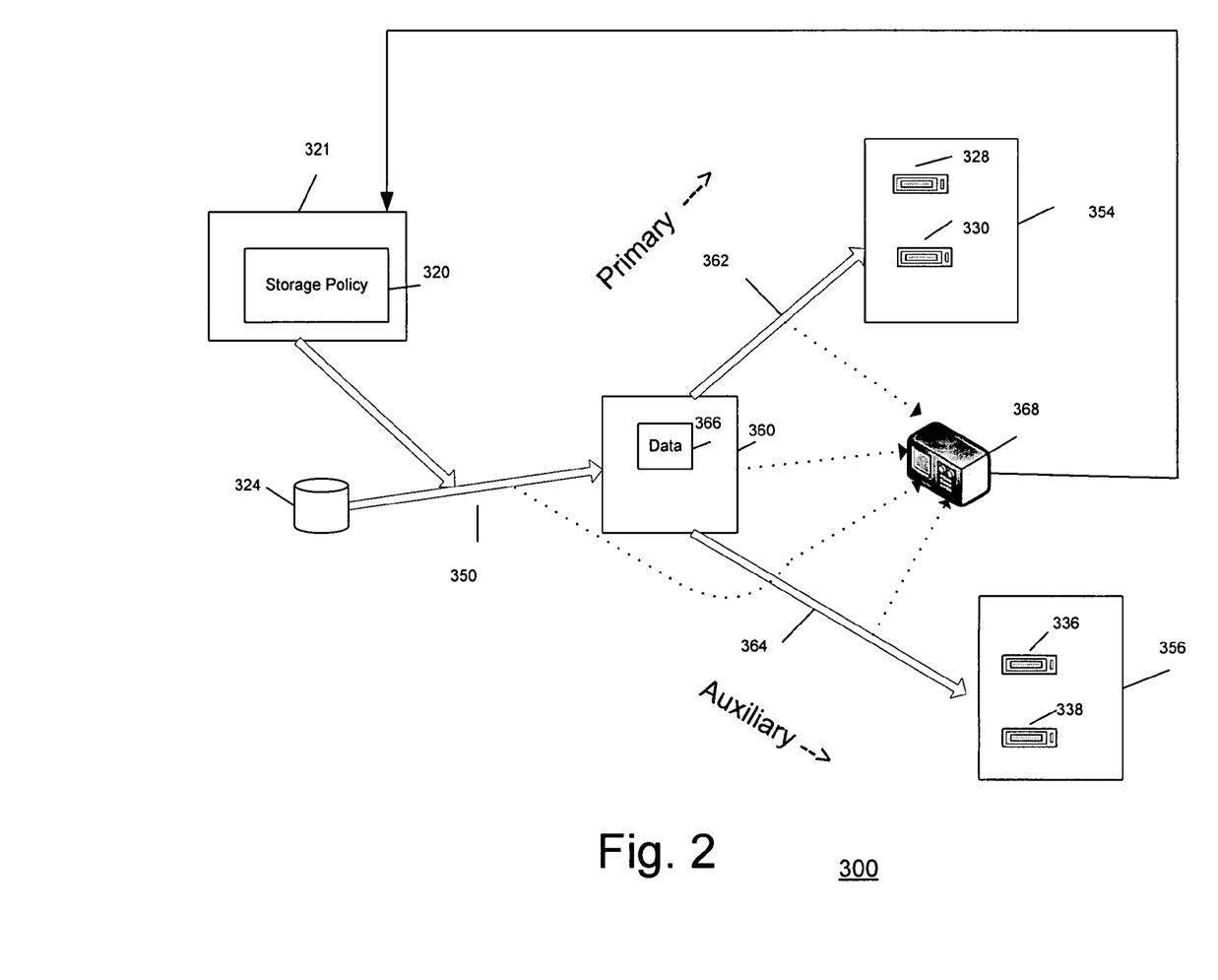
FIG. 2 is a block diagram showing a storage system in accordance with one embodiment of the invention.

Embodiments of the invention are now described with reference to the drawings in the Figures. Referring to FIG. 2, a tiered storage system 300 in accordance with an embodiment of the invention is shown which allows for the production of auxiliary copies of production data at approximately the same time as, and through an independent storage operation from, the production of primary copies. In accordance with storage polices 320 in a storage manager 321, live, production data from a data store 324 is copied to produce intermediate data 366 in a buffer 360. This intermediate data is then copied through a first storage operation 362 to a primary copy 354 stored on storage devices 328 and 330, and is also copied through a second storage operation 364 to auxiliary copy 356 on storage devices 336 and 338.

Since system 300 is a tiered storage system, the storage media 328, 330 used to store primary copies are typically faster, higher capacity, more readily available and more expensive than the storage devices 336, 338 used for auxiliary copies. For example, storage media 328, 300 may be magnetic disks, such as hard drives, while storage media 336, 338 may be removable media or other slower storage devices or media used for longer term storage.

The storage operations shown in FIG. 2 may be performed on a chunk by chunk basis, through a data pipe mechanism 350 such as the one described in commonly owned U.S. Pat. No. 6,418,478 titled PIPELINED HIGH SPEED DATA TRANSFER MECHANISM, which is hereby incorporated herein by reference, or by other copy operations known to those of skill in the art. The data pipe mechanism 350 may include one or more data agent components and one or more media management components as described in the commonly owned patent applications referenced above and as further described below with reference to FIG. 7. The data pipe mechanism 350 moves data as quickly as possible between two points, which may be on the same or different computers within a network, while performing a variety of operations (such as compression, encryption, content analysis, etc.) on the data. The data pipe mechanism 350 includes a named set of tasks executing within one or more computers that cooperate with each other to transfer and process data in a pipelined manner. Any of the components included in the pipeline may have multiple instances, thus greatly increasing the scalability and performance of the operation.

The data pipe mechanism 350 processes data by dividing its processing into logical tasks that can be performed in parallel. It then sequences those tasks in the order in which they are to act on the data. For example, a head task may extract data from a database, a second task may encrypt it, a third may compress it, a fourth may send it out over the network, a fifth may receive it from the network, and a sixth may write it to a tape. The latter two tasks may reside on a different computer than the others, for example. All of the tasks that comprise a single data pipe mechanism 350 on a given computer have access to a segment of shared memory that is divided into a number of buffers. A small set of buffer manipulation primitives is used to allocate, free, and transfer buffers between tasks. Semaphores (or other OS specific mutual exclusion or signaling primitives) are used to coordinate access to buffers between tasks on a given computer. Special tasks, called network agents, send and receive data across network connections using standard network protocols. These agents enable the data pipe mechanism 350 to connect across multiple computer systems. Each task may be implemented as a separate thread, process, or as a procedure depending on the capabilities of the computing system on which the data pipe mechanism 350 is implemented.

When the production data is prepared for copying, it is broken into chunks of data, each of which has a chunk payload and is encapsulated with metadata describing the contents of the chunk placed in a tag header for the chunk. The tag header indicates that the source data will be virtually simultaneously streamed to two distinct media destinations. Thereafter, a first storing process 362 reads data 366 in buffer 360 and stores data 366 in physical media locations 328, 330 to produce a primary copy 354. Before the storage of data 366 is completed in media 328, 330 a second storing process 364 reads data 366 in buffer 360 and stores data 366 in physical media locations 336, 338 to produce an auxiliary copy 356.

A storage device management component, such as the media management component (not explicitly shown) in data pipe 350, adds a tag header to data 366 indicating the type of media to which the production data will be stored 328, 330, 336 and 338. The tag header may also include information relating to a time to perform one or more storage operations, a type of storage operation to perform on data 366, such as a primary copy, auxiliary copy, cascading auxiliary copy, or other copy or storage operation. For example, the tag header may indicate that a primary copy and a certain number of cascading auxiliary copies are to be created substantially simultaneously. The tag header information may be based on a storage policy associated with the client, production data, or production data store. A media management component may read the tag header information to determine the time to perform a storage operation, the type of storage operation to perform, the type of media to which to copy data 366, or other information relating to performing a storage operation. The media types may be determined by reference to the storage policy 320, or by reference to data stored on the media management component regarding the types of storage devices to which the media management component is attached.

In some embodiments, the system removes the encapsulation from each chunk prior to copying it to the primary copy 354 or auxiliary copy 356, and stores the chunk on a single instance storage device. The single instance storage device may return a signature or other identifier for items copied from the chunk payload. The metadata associated with the chunk may be maintained in separate storage and may track the association between the logical identifiers and the signatures for the individual items of the chunk payload. This process is described further in commonly owned co-pending patent application Ser. No. 11/269512, filed Nov. 7, 2005, titled SYSTEM AND METHOD TO SUPPORT SINGLE INSTANCE STORAGE OPERATIONS, which has been incorporated herein by reference.

A monitoring module 368 monitors the transfer of data through data pipe 350, buffer 360 and storing processes 362, 364. If an interruption occurs in a first one of processes 362, 364, monitoring module 368 informs management server 321 of the interruption and ensures that data is still transferred in the second one of processes 362, 364. Once data transfer is complete in the second one of processes 362, 364, monitoring module 368 continues the first one of processes 362, 364 until completion.

By using two distinct storing processes 362, 364, primary copy 354 and auxiliary copy 356 may be stored on distinct media—such as tapes, magnetic media, optical media, etc. Moreover, if there is an interruption in either storing process 362, 364, the other process may still continue. This allows for the production of an auxiliary copy even without a primary copy, or even if the primary copy becomes lost or corrupted. Further, the creation of primary copy 354 and auxiliary copy 356 need not be synchronous and so the creation of auxiliary copy 356 may actually precede the creation of primary copy 354.

Figure 3:
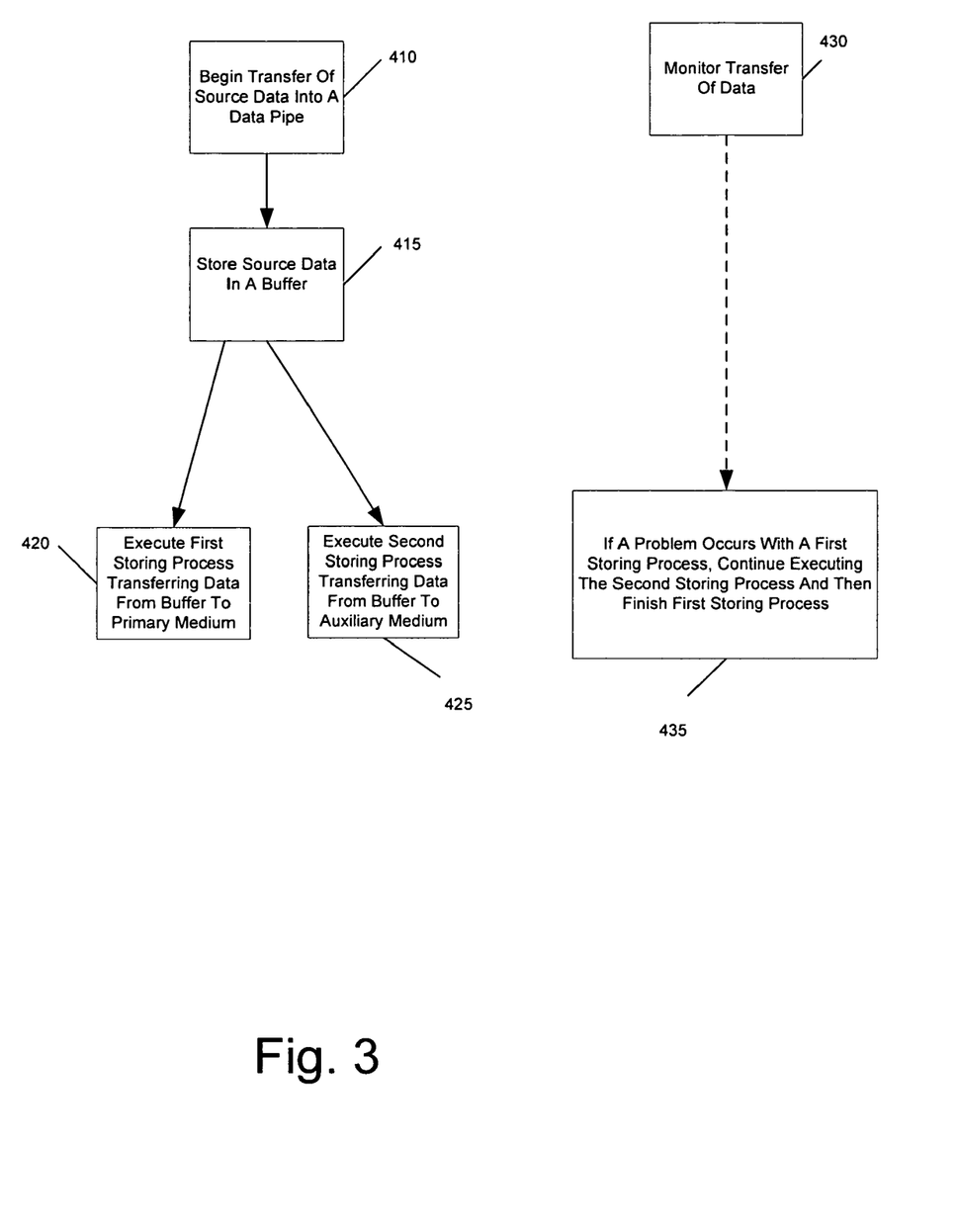
FIG. 3 is a flow chart illustrating a process of producing primary and auxiliary copies through distinct processes, in accordance with an embodiment of the invention.

Referring now to FIG. 3, a process according to an embodiment of the invention of storing production data starts, at step 410, when a storage management server starts the transfer of production data from a data source into a data pipe. The process may be started at the request of a user or may be scheduled to occur at regular intervals, at a time specified in a storage policy or upon the occurrence specified event. The production data is broken in data chunks each encapsulated by a tag containing metadata about the data in the respective chunk. At step 415, the copy of the production data is stored in a buffer. In steps 420 and 425, two storage processes are started, in any order and according to any desired relative timing—one, step 420, in which a first storing process is executed to transfer the production data copy stored in the buffer to a first set of storage devices to produce a primary copy, and another, step 425, in which a second storing process is executed which transfers the data in the buffer to auxiliary media to produce an auxiliary copy. During the execution of steps 410, 415, 420 and 425, at step 430, a monitoring module monitors the transfer of production data from the data source to the buffer and both the primary and auxiliary media. At step 435, if there is a problem in a first one of the storing processes, the monitoring module informs the storage management component such as the media management component, performing the operation to interrupt the process having the problem while the second one of the storing processes completes. Once the problem is resolved, the first storing process is restarted and performed to completion.

Figure 4:
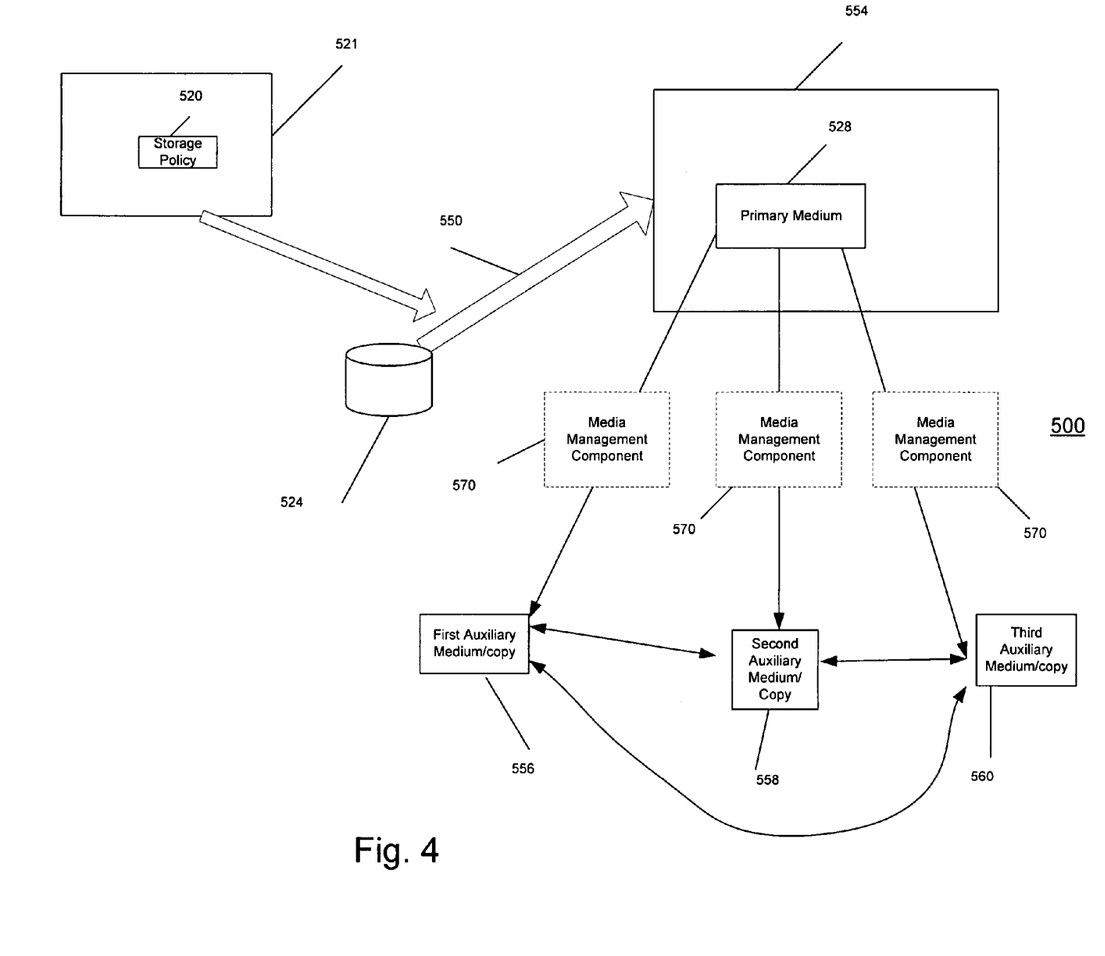
FIG. 4 is a block diagram showing a storage system in accordance with another embodiment of the invention.

In accordance with another aspect of the present invention, it may be advantageous to create a series of auxiliary copies in cascaded fashion. Such a system 500 is shown in FIG. 4. In accordance with storage policies 520 in a management server 521 production data from a production data store 524 is copied, chunk by chunk, to a primary medium 528. The data chunks each have a tag header containing metadata describing the contents of the chunk. The production data in production data store 524 is copied to primary medium 528 by going through a data pipe 550, such as data pipe 350 as described above. An auxiliary copy of production data in production data store 524 is then made from primary copy 554 to first auxiliary copy medium 556. An auxiliary copy of production data store 524 may be made from primary copy 528 to second auxiliary medium 558 and to third auxiliary medium 560. These copies are made by sending the data in primary copy 554 to a media management component 570 which may be a media management component used in data pipe 550. Media management component 570 removes the encapsulations around the chunks of data it receives and then encapsulates the data chunks by including a tag header indicating the type of media upon which respective first, second or third auxiliary copies 556, 558, 560 are to be stored. In this way, second auxiliary copy 558 is made from first auxiliary copy 556 or third auxiliary copy 560—assuming of course that third auxiliary medium 560 includes data available for copying. The media management component 570 reads the header to determine the type of storage medium each copy is on and performs read or write operations from or to a storage device using the formatting required for the type of device or medium. Similarly, third auxiliary copy 560 may be created from primary copy 554, first auxiliary medium 556 or second auxiliary medium 558. Clearly, all permutations among first, second and third auxiliary copies/media may be used and the invention is not limited to three pieces of media.

Figure 5:
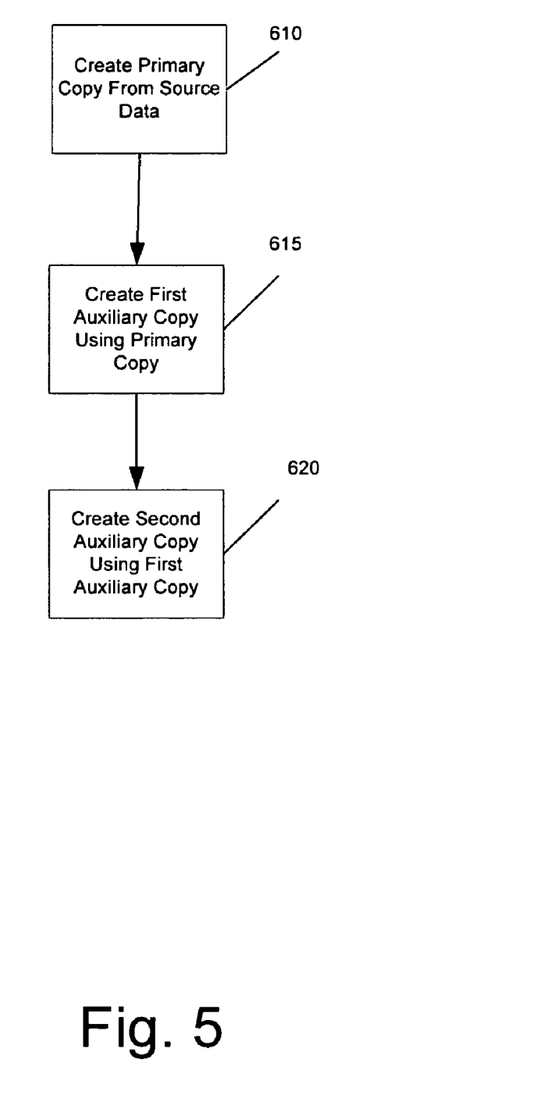
FIG. 5 is a flow chart illustrating a process of producing auxiliary copies in cascaded fashion, in accordance with an embodiment of the invention.

This process for creating cascading copies is set forth in FIG. 5. As shown in FIG. 5, a primary copy 554 is first made from production data retrieved from a production data store 524, step 610. Such a copy could be made using, for example, a data pipe, and the production data is broken into data chunks encapsulated in metadata headers. At step 615, a first auxiliary copy 556 is made based on the primary copy 554. At this step, the storage process reads the header to determine what type of storage device or storage media is going to be used to store the auxiliary copy, and formats the data chunks accordingly for that device or media type. At step 620, a second auxiliary copy 558 is made based on the first auxiliary copy 556, with the chunks again being reformatted as necessary to match the type of device or media upon which the second auxiliary copy is to be stored. Additional auxiliary copies may be made in the same fashion.

In this way, auxiliary copies 556, 558, 560 may be made without requiring access to the primary copy 554 or production data—because a second auxiliary copy 558 may be made by simply accessing a first auxiliary copy 556. Moreover, there may be less data stored in the auxiliary copy 556, 558, 560 because the auxiliary copy 556, 558, 560 may be made immediately before the primary copy 554 (or production data) is deleted (which could be scheduled to occur, according to a policy, for example, once every sixty days). Such a policy for auxiliary copying may be quite useful in situations in which maintaining a primary copy 554 or production data is less critical. Continuing with the example, if on day three data is changed in the primary copy 554, the changed data may not be reflected in first auxiliary copy 556 until day sixty-one. Alternatively, first auxiliary copy 556 may be made on day one using primary copy 554 and then second auxiliary copy 558 is made on day sixty-one. Further, as an auxiliary copy 556, 558, 560 is being made, distinct protocols may be used for the primary copy 554 and auxiliary copies 556, 558, 560 and a different form of media may be used.

Figure 6:
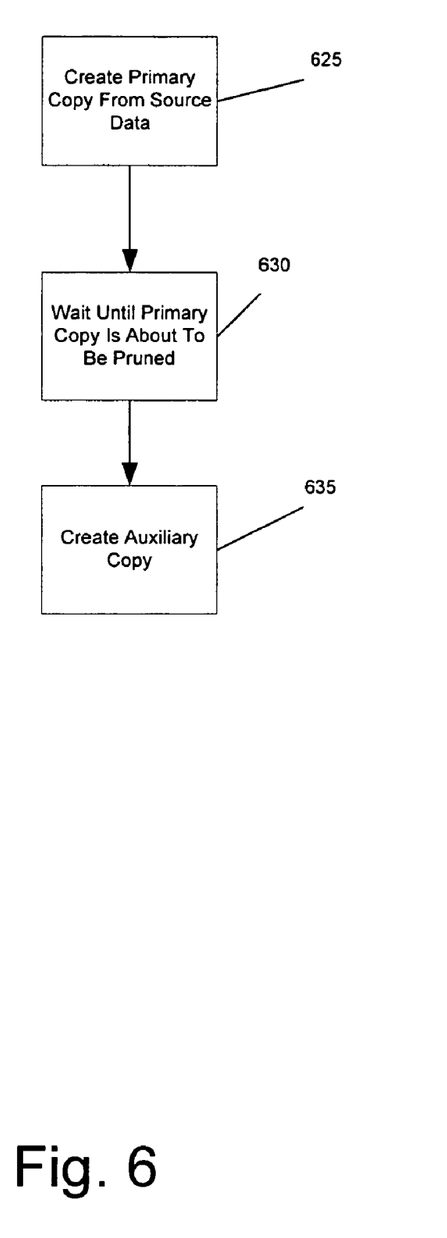
FIG. 6 is a flow chart illustrating a process of producing an auxiliary copy in accordance with an embodiment of the invention.

Data may be copied from primary medium 528 to first auxiliary medium 556 some time before the data on primary medium 528 is deleted. For example if the storage policy for primary medium 528 indicates that the data in primary medium 528 is to be deleted after sixty days, data stored in primary medium 528 from a first day will be transferred from primary medium 528 to, for example, first auxiliary medium 556 on the fifty-ninth day. This process is shown in FIG. 6, in which, at step 625, a primary copy is created from production data in a data source, following which a storage system waits until the data in the primary copy is about to be deleted, step 630, right before which it makes an auxiliary copy, step 635.

In some embodiments, the single instance copying process described above is used for making the auxiliary copies. That is, a single instance copy is made of the data chunks, and different headers for the chunks are configured for the different formats of the different types of storage devices or media on which the various auxiliary copies are stored. These headers are then stored on the respective auxiliary storage devices in connection with a hash or fingerprint of the chunk with which the header is associated.

Figure 7:
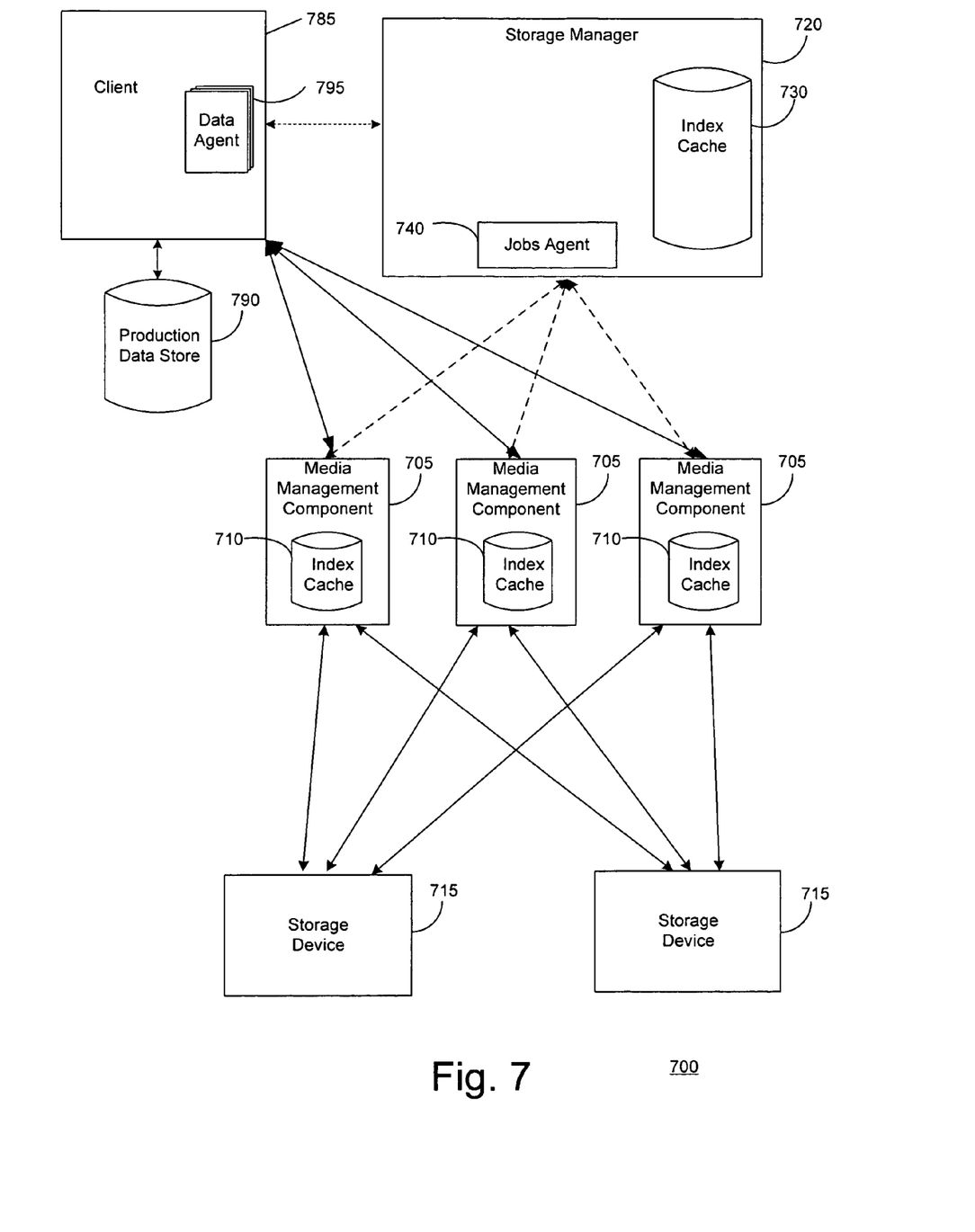
FIG. 7 is a block diagram showing a storage system in accordance with an embodiment of the invention.

The methods and functions described herein may be present in any tiered storage system. A specific example of one such system is shown in FIG. 7. Storage system 700 includes a storage manager 720 and one or more of the following: a client 785, a production data store 790, a data agent 795, a jobs agent 740, a plurality of media management components 705, a plurality of storage devices 715, a plurality of media management component index caches 710 and a storage manager index cache 730. The system and elements thereof are further described in application Ser. No. 09/610,738 which is incorporated by reference in its entirety.

Data agent 795 is generally a software module that is generally responsible for storage operations such as archiving, migrating, and recovering data of client computer 785 stored in a production data store 790 or other memory location. Each client computer 785 has at least one data agent 795 and system 700 can support many client computers 785. System 700 provides a plurality of data agents 795 each of which is intended to perform storage operations such as backups, migration, and recovery of data associated with a different application. For example, different individual data agents 795 may be designed to handle MICROSOFT EXCHANGE data, LOTUS NOTES data, MICROSOFT WINDOWS 2000 file system data, MICROSOFT Active Directory Objects data, and other types of data known in the art.

Further, at least one or more of the data agents may by implemented with, or contain, or be contained in, one or more procedures which are executed by a data pipe described above. These procedures perform tasks such as compression, encryption, and content analysis of data for transmission in a shared memory.

If client computer 785 has two or more types of data, one data agent 795 is generally used for each data type to archive, migrate, and restore the client computer 785 data. For example, to backup, migrate, and restore all of the data on a MICROSOFT EXCHANGE 2000 server, client computer 785 would use one MICROSOFT EXCHANGE 2000 Mailbox data agent 795 to backup the Exchange 2000 mailboxes, one MICROSOFT EXCHANGE 2000 Database data agent 795 to backup the Exchange 2000 databases, one MICROSOFT EXCHANGE 2000 Public Folder data agent 795 to backup the Exchange 2000 Public Folders, and one MICROSOFT WINDOWS 2000 File System data agent 795 to backup the file system. These data agents 795 would be treated as four separate data agents 795 by system 700 even though they reside on the same client computer 785.

Each media management component 705 maintains an index cache 710 which stores index data the system generates during storage operations as further described herein. For example, storage operations for MICROSOFT EXCHANGE generate index data. Index data includes, for example, information regarding the location of the stored data on a particular media, information regarding the content of the data stored such as file names, sizes, creation dates, formats, application types, and other file-related criteria, information regarding one or more clients associated with the data stored, information regarding one or more storage policies, storage criteria, or storage preferences associated with the data stored, compression information, retention-related information, encryption-related information, stream-related information, and other types of information. Index data thus provides the system with an efficient mechanism for performing storage operations including locating user files for recovery operations and for managing and tracking stored data.

The system generally maintains two copies of the index data regarding particular stored data. A first copy is generally stored with the data copied to a storage device 715. Thus, a tape may contain the stored data as well as index information related to the stored data. In the event of a system restore, the index data stored with the stored data can be used to rebuild a media management component index 705 or other index useful in performing storage operations. In addition, the media management component 705 that controls the storage operation also generally writes an additional copy of the index data to its index cache 710. The data in the media management component index cache 710 is generally stored on faster media, such as magnetic media, and is thus readily available to the system for use in storage operations and other activities without having to be first retrieved from the storage device 715.

The storage manager 720 also maintains an index cache 730. Storage manager index cache 730 is used to indicate, track, and associate logical relationships and associations between components of the system, user preferences, management tasks, and other useful data. For example, the storage manager 720 might use its index cache 730 to track logical associations between media management components 705 and storage devices 715. The storage manager 720 may also use its index cache 730 to track the status of storage operations to be performed, storage patterns associated with the system components such as media use, storage growth, network bandwidth, service level agreement ("SLA") compliance levels, data protection levels, storage policy information, storage criteria associated with user preferences, retention criteria, storage operation preferences, and other storage-related information. Index caches 730 and 710 typically reside on their corresponding storage component's hard disk or other fixed storage device. For example, the media management component 705 of a storage manager component 720 may retrieve storage manager index cache 710 data regarding a storage policy and storage operation to be performed or scheduled for a particular client 785. The media management component 705, either directly or via some interface module, communicates with the data agent 795 at the client 785 regarding the storage operation.

Jobs agent 740 may also retrieve from the index cache 730 a storage policy (not shown) associated with the client 785 and use information from the storage policy to communicate to the data agent 795 one or more media management components 705 associated with performing storage operations for that particular client 785 as well as other information regarding the storage operation to be performed such as retention criteria, encryption criteria, streaming criteria, etc. The data agent 795 then packages or otherwise manipulates the client data stored in the client production data store 790 in accordance with the storage policy information and/or according to a user preference, and communicates this client data to the appropriate media management component(s) 705 for processing. The media management component(s) 705 store the data according to storage preferences associated with the storage policy including storing the generated index data with the stored data, as well as storing a copy of the generated index data in the media management component index cache 710.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for storing data in a tiered storage system, the method comprising:

accessing a storage policy associated with a tiered data storage system, wherein the storage policy defines migration of data within the tiered data storage system, the storage policy defining:

copying source data from a data source to a primary copy stored in a first storage media destination in the tiered data storage system, wherein the first storage media destination is a first type of storage comprising one or more hard drive storage devices; and simultaneously streaming at least a portion of the source data from the data source to an auxiliary copy stored in a second storage media destination in the tiered data storage system, wherein the second storage media destination is a second type of storage comprising one or more removable storage devices wherein the second type of storage is different then the first type of storage;

when the storage policy indicates that a storage operation is to be performed within the tiered data storage system, copying the source data according to the storage policy from the data source to a first buffer location to produce intermediate data, wherein the copying of the source data to produce the intermediate data comprises:

dividing the source data into a plurality of chunks;

encapsulating by a media management component, each of the chunks with a header portion that is based on the storage policy, wherein the header portion comprises metadata that indicates at least two distinct storage media destinations to which each respective chunk is to be copied, the two distinct storage media destinations comprising the first storage media destination and the second storage media destination, and wherein the header portion further indicates the first and second types of storage associated with the first and second storage media destinations, and wherein a media management component reads the header portion to determine the types of storage and performs read or write operations using the formatting required for the types of storage, and transferring the plurality of chunks from the data source to the first buffer location;

copying the intermediate data, according to the header portions, to the first storage media destination to produce a primary copy of the source data on the first type of storage;

removing the header portion with the two distinct storage media destinations from each chunk in the intermediate data when copying the chunks to the first storage media destination; and while the primary copy is still being produced, simultaneously streaming one or more of the chunks of the intermediate data, according to the header portions, to the second storage media destination to produce an auxiliary copy of the source data on the second type of storage, the second type of storage being a different type than the first type of storage; and removing the header portion with the two distinct storage media destinations from each chunk in the intermediate data when copying the chunks to the second storage media destination.

2. The method of claim 1, comprising monitoring the copying of the intermediate data to the first and second storage media destinations.

3. The method of claim 2, comprising:

determining that an interruption occurred in the production of the primary copy or auxiliary copy;

completing the production of the uninterrupted copy; and thereafter, when the interruption is resolved, completing the interrupted production of the primary or auxiliary copy.

4. The method of claim 1, wherein copying the source data further comprises using a data pipe.

5. The method of claim 1, wherein copying the intermediate data to the first and second storage media destinations comprises formatting the intermediate data in a first format based on the first type storage associated with the first storage media destination and formatting the intermediate data in a second format based on the second type of storage associated with the second storage media destination.

6. The method of claim 1, wherein the second type of storage comprises a tape.

7. The method of claim 1, wherein the storage policy comprises a user-defined policy.

8. The method of claim 1, wherein said copying the source data further comprises performing compression on the source data.

9. The method of claim 1, wherein said copying the source data further comprises performing encryption on the source data.

10. The method of claim 1, further comprising:

determining when the primary copy is about to be deleted; and performing a copy of the primary data to a third storage media destination.

11. The method of claim 1, further comprising producing multiple auxiliary copies of the source data.

12. The method of claim 11, wherein producing multiple auxiliary copies comprises:

creating a single instance copy of each chunk; and storing the header portion and a fingerprint of the data of each of the plurality of chunks on multiple storage media.

13. The method of claim 1, wherein the header portion further indicates a time to produce the primary copy or the auxiliary copy.

14. The method of claim 1, wherein the header portion is based at least in part on information contained in the storage policy.

15. A method which, when executed on a computer, stores data in a tiered storage system, the method comprising:

accessing a storage policy associated with at tiered data storage system, wherein the storage policy defines copying source data from a data source to at least two distinct storage media destinations in the tiered data storage system;

copying the source data according to said storage policy from the data source to a first buffer location to produce intermediate data, wherein said copying comprises:

dividing the source data into a plurality of portions, and assigning by a media management component each of the plurality of portions a tag header, the tag header comprising the two distinct storage media destinations associated with the storage policy, the two distinct storage media destinations comprising a first storage media destination and a second storage media destination and wherein a media management component reads the tag header to determine types of storage associated with the first and second media destinations and to perform read or write operations using the formatting required for the types of storage, and copying the intermediate data, according to said tag headers, to the first storage media destination to produce a primary copy of the source data; and while the primary copy is being produced, simultaneously streaming one or more portions of the intermediate data, according to said tag headers, to the second storage media destination to produce a secondary copy of the source data.

16. The method of claim 15, comprising monitoring the copying of the source data from the data source to the first location.

17. The method of claim 15, comprising monitoring the copying of the intermediate data to the first storage media destination.

18. The method of claim 17, comprising monitoring the copying of the intermediate data to the second storage media destination.

19. The method of claim 18, comprising:
determining that an interruption occurred in the production of the primary copy or secondary copy;
completing the production of the uninterrupted copy; and
thereafter, when the interruption is resolved, completing the interrupted production of the primary or secondary copy.

20. The method of claim 15, wherein copying the source data from the data source to the first location comprises using a data pipe.

21. The method of claim 15, wherein copying the intermediate data to the first and second storage media destinations comprises formatting the intermediate data in a first format based on a media type of the first storage media destination and formatting the intermediate data in a second format based on the a media type of the second storage media destination.

22. A method for performing multiple storage operations on data in a tiered storage system, the method comprising:
receiving storage policy information from a storage manager module, the storage policy information associated with a tiered data storage system, wherein the storage policy defines copying source data from a data source to distinct first and second storage media destinations;
copying the source data according to said storage policy information from the data source to a first buffer location to produce intermediate data, wherein said copying comprises,
obtaining the source data from the data store using at least one media agent module,
dividing the source data into a plurality of chunks,
associating by a media management component each of the plurality of chunks with a header portion, wherein each header portion indicates at least the following information:
(1) at least the first and second storage media destinations to which the corresponding one of the plurality of chunks is to be copied,
(2) first and second distinct types of storage associated with the first and second storage media destinations to which the corresponding one of the plurality of chunks is to be copied, and
(3) one or more times at which the corresponding one of the plurality of chunks is to be copied, and
reading the header portions with a media management component to determine first and second types of storage associated with the first and second storage media destinations and to perform read or write operations using the formatting required for the first and second types of storage;
copying the intermediate data, according to the information stored in said header portions, to the first storage media destination to produce a first copy of the source data on the first type of storage; and
while the first copy is being produced, simultaneously streaming copies of one or more chunks of the intermediate data, according to the information stored in said header portions, to the second storage media destination to produce a second copy of the source data on the second type of storage.

23. The method of claim 22, wherein said copying the intermediate data to at least one of the first storage media destination and the second storage media destination is performed with the media management component.

24. The method of claim 23, additionally comprising maintaining an index with the media management component indicating the location of the first copy on the first storage media destination.

25. The method of claim 24, additionally comprising maintaining a copy of the index on the first storage media destination.

* * * * *

UNITED STATES PATENT AND TRADEMARK OFFICE
CERTIFICATE OF CORRECTION

PATENT NO.       : 7,490,207 B2
APPLICATION NO.  : 11/269119
DATED            : February 10, 2009
INVENTOR(S)      : Arun Prasad Amarendran et al.

Page 1 of 1

It is certified that error appears in the above-identified patent and that said Letters Patent is hereby corrected as shown below:

On the Title Page, Item (54) (Title), Line 2, change "AUXILLARY" to --AUXILIARY--.

At Column 1, Line 32, change "No. 101144,683," to --No. 10/144,683,--.

At Column 2, Line 3, after "2005" insert --.--.

At Column 13, Line 22, in Claim 21, after "on" delete "the".

Signed and Sealed this

Twenty-third Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,490,207 B2  
APPLICATION NO. : 11/269119  
DATED : February 10, 2009  
INVENTOR(S) : Arun Prasad Amarendran et al.

It is certified that error appears in the above-identified patent and that said Letters Patent is hereby corrected as shown below:

On the Title Page, Item (54) (Title), Line 2, and Column 1, Line 2, change "AUXILLARY" to --AUXILIARY--.

At Column 1, Line 32, change "No. 101144,683," to --No. 10/144,683,--.

At Column 2, Line 3, after "2005" insert --.--.

At Column 13, Line 22, in Claim 21, after "on" delete "the".

This certificate supersedes the Certificate of Correction issued June 23, 2009.

Signed and Sealed this

Twenty-first Day of July, 2009

JOHN DOLL  
*Acting Director of the United States Patent and Trademark Office*